Figure 12:
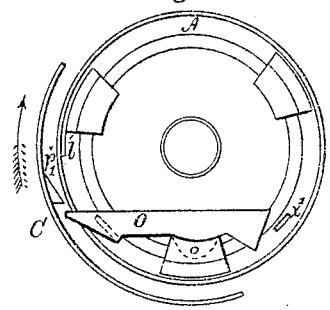

G. B. GRANT.
Calculating-Machines.
No. 138,245.  Patented April 29, 1873.
3 Sheets--Sheet 1.
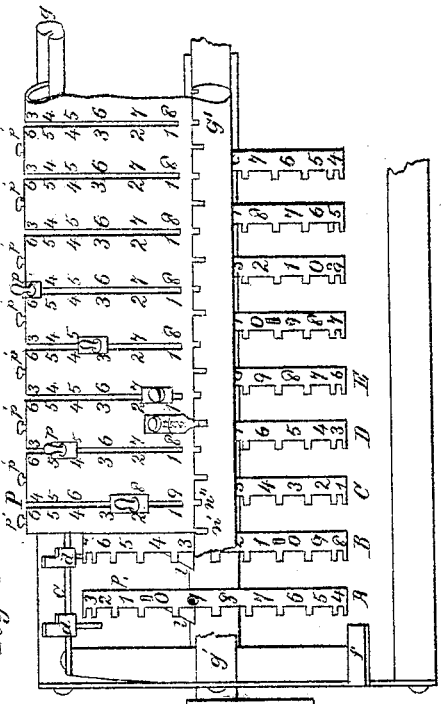
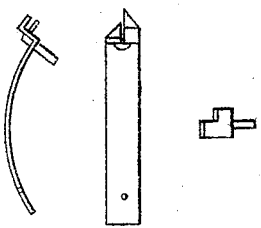
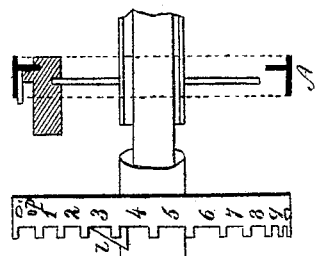
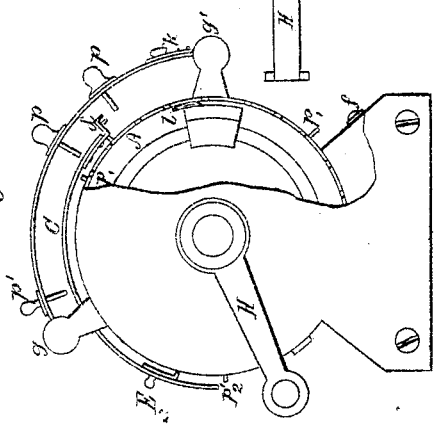
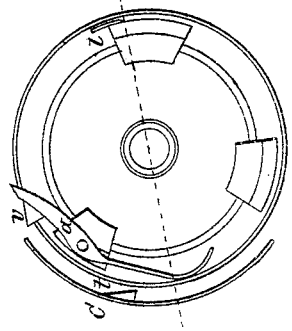
Witnesses.
John B. Sawin
Susan S. Sawin
Inventor.
Geo. B. Grant 3 Sheets--Sheet 2.
G. B. GRANT.
Calculating-Machines.
No. 138,245.      Patented April 29, 1873.
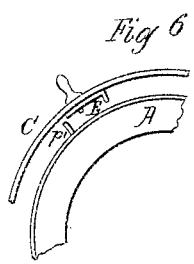
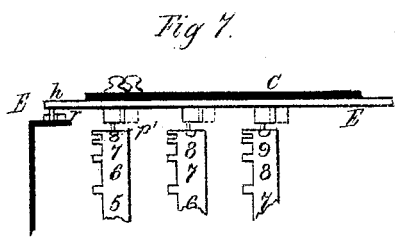
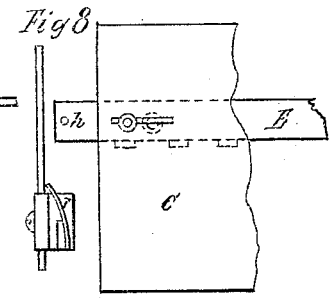
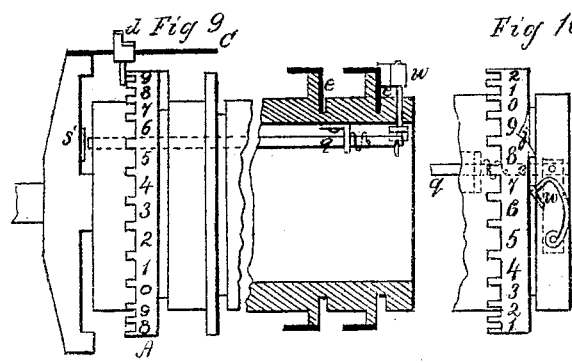
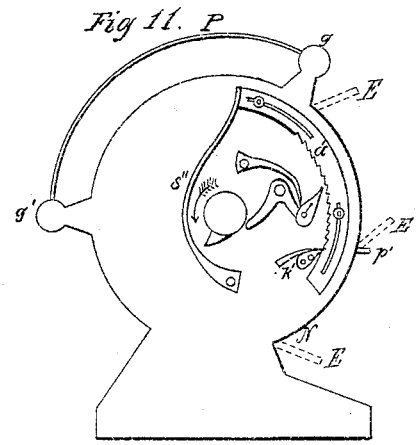
Witnesses.
John B. Sawin
Susen A. Sawin
Inventor.
Geo. B. Grant 3 Sheets--Sheet 3.

G. B. GRANT.
Calculating-Machines.

No. 138,245. Patented April 29, 1873.

Witnesses.
John B. Sawin.
Susan N. Sawin.

Inventor.
Geo. B. Grant.

AM. PHOTO-LITHOGRAPHIC CO. N.Y. (OSBORNE'S PROCESS.)

UNITED STATES PATENT OFFICE.

GEORGE B. GRANT, OF CAMBRIDGE, MASSACHUSETTS.

IMPROVEMENT IN CALCULATING-MACHINES.

Specification forming part of Letters Patent No. 138,245, dated April 29, 1873; application filed December 30, 1872.

*To all whom it may concern:*

Be it known that I, GEO. B. GRANT, of Cambridge, in the county of Middlesex and State of Massachusetts, have invented certain Improvements in Calculating-Machines, of which the following is a specification:

This machine is similar to the one for which I received a patent dated July 16, 1872, No. 129,335, but, as all the parts have been more or less changed, I shall describe it anew without reference to the specification of that patent.

Upon this machine all calculations are reduced to addition, more or less compounded to suit the various requirements; and it therefore consists of mechanism by which a fixed or constant number may be added to a varying one any number of times in succession.

The fixed number is set up on the plate P, which slides in guides $g$ $g'$ on the top of the machine. The varying number is shown on the set of wheels under the plate, and the addition of the two numbers is accomplished by the mechanism on the moving carriage C, which is turned by the handle H. The curved plate or "indicator" is furnished with several rows of holes or with slots, in any part of which a pin, $p$, may be fixed which projects through the plate. The rows or slots are numbered from below upward from 1 to 9, and the fixed number is set up by moving the pins to the figures of that number, the lowest slot representing units, the next tens, and so on. The number thus indicated is multiplied or divided by ten if the plate be moved up or down one space equal to the distance between the slots. The spaces and half-spaces are marked upon the guides $g'$ by large and small nicks $n'$ and $n''$, and the plate is held at any nick by the click $k$. The holes or slots are also marked with another set of smaller figures, which are complements of the larger ones, and are used in some cases in setting up a negative number, as the minuend or divisor. The secondary pins $p'$ are placed half way between the others, and their use will be explained further on. The wheels A B C, &c., are placed directly under the slots in the plate, and each wheel is divided into two or, preferably, three sets of ten teeth each, each tooth being marked with a figure. The wheel may take any shape, but is preferably a ring with a wide tire, Figs. 3 and 4, upon which the figures are marked, and upon one side of which the teeth are made. The ring may be dispensed with and the tire alone retained, as sketched in Fig. 9, the pieces $e$ moving in the channels and keeping it in position. The carriage C is moved by the handle H, and is provided with drivers $d$, one driver for each wheel. The driver, Fig. 5, is slightly movable sidewise, and, when not in action, moves in the space between the wheels, but when thrown between the teeth of the wheel by any means it moves it till it comes to the piece $l$, Fig. 2, which throws it back into the space. The figures on the slot correspond to the teeth of the wheel below, and when a pin is placed at any figure—seven, for instance—it will be struck by the driver at a distance of seven teeth from $l$. The pin thus throws the driver onto the wheel, so that it shall add to it the number that it is placed at on the slot. The driver is pointed where the pin strikes it, and, if struck on the right, will be thrown on, and, if on the left, off the wheel. If the plate is in a small or negative nick, the pin will strike to the left of the driver and will throw it off if it be on. The secondary pin $p'$ will strike the right of the driver when the plate is in a small nick, and will throw it on to be thrown off by the pin $p$ after having added a number, which is the complement of the figure $p$ is placed at. This is one way in which the subtraction of a number can be effected, and the number set up is either added or subtracted from that on the wheels at every turn of the handle. Subtraction is also effected by setting up the minuend according to the smaller figures on the slots, as its complement would then be added; and by this method the same number would be added by placing the plate in the smaller nicks. The left side of the driver is made lower than the right, and the secondary pins shorter than the others, as it is only in subtraction that both pins are used.

Before commencing an operation the wheels must be all set to zero, and an apparatus is provided to erase whatever figures are on it at one motion of the hand. The wheels are provided with pins $p$, projecting a short distance from their faces, and on the carriage is a sliding bar or eraser, E, provided with teeth, below which can be placed in the path of the pins by hand; but when not in action allow the pins to pass between them untouched. The carriage being at its starting-point the eraser is just half a tooth behind the zero position of the pins, and on the carriage being move backward nine spaces and a half all the wheels are brought to zero. The eraser is stopped at the proper point of its backward motion by the post $f$ on the frame of the machine. The post may be inclined so as to throw the eraser out of action when it strikes, but in that case it will not leave the wheels as accurately in position as if it was stopped by the post and set back by hand or by the contrivance shown in Figs. 7 and 8, in which, on going backward, the pin $h$ on the eraser pushes by the spring $r$, but on returning it slides up it, and is put out of action. Another but reversed spring might be used in the first half space to throw the eraser into action, but it is objectionable, as it gives a sharp click at every passing. Another and simpler, but not as convenient, a form is shown in Fig. 11. The pins are placed as before, and the arc M N of the frame is slightly higher than the surface of the wheels, and extends over nine teeth and a half. To erase, it is only necessary to pick up any convenient rod or rule, and holding it in both hands to slide it from M to N in contact with the arc. The carrying apparatus will prevent the wheels from going backward too far by their own momentum.

The "automatic stops," one to each wheel, are attached to the frame between the wheels, Fig. 3. The wheels after having considerable velocity when the driver is thrown off by $l$, will go by the proper point, and an error will follow if they are not checked.

The wheels when few in number, or a few of them when their number is large, may be put under enough friction by a spring or other suitable means to stop them when left by the driver at any given speed; but when there are many of them, or the speed used is high, the combined resistance is highly objectional when the machine is worked by hand, and the automatic stop is provided to remove that objection. The lever $a$ is fastened to the frame and its two arms are in the path of the pin $t$ on the carriage C, and the first arm is struck as the driver commences to come off the wheel and has been pressed fully down as it leaves it. The stop $v$ is attached to the lever, and will be placed between the teeth of the wheel and will stop it. When $t$ reaches the other arm of the lever it will throw it back, and the stop will be drawn out of the teeth forcibly. The first arm is in the form of a spring to prevent the stop being forced up if it should happen to strike on a tooth instead of between the teeth. The automatic stop is not a friction-stop, but may act as one, if desired, by removing the point of $v$. The wheels should be held by light springs in addition to the stops, since if they were perfectly free they would be liable to disarrangement by accidental causes.

The "quotient stop," shown in Figs. 9 and 10, is the mechanism by which the process of division is for the first time rendered perfectly automatic and independent of the mind or judgment of the operator. When the divisor is continually subtracted from the dividend till it leaves it smaller than itself the number of subtractions made denotes the quotient; but as determining mechanically when the dividend is smaller than the divisor is a difficult problem to be solved, and would give rise to complicated and delicate mechanism, some coarser and more mechanical means had to be devised.

It was observed by me, that if when the dividend is smaller than the divisor, the subtraction be carried once further, that a number would be subtracted from a smaller one, and a negative number would be the result, and where negative numbers are expressed by their complements, their mechanical perception is easy, since the higher wheels read nine further. At the last wheel that is to be used in division I place a mechanism that shall indicate when that wheel reads nine, and the carriage is at the same time at its starting position. The particular method preferred is to cut a nick, $j$, in the tire, which shall let a piece, $w$, drop into it as the wheel reads nine. The piece $w$ is attached to the stop $q$ by a pivot, which, when let out, will be in the path of a stud, $s'$, on the carriage, and if the carriage completes its revolution when the wheel remains on nine, it will be stopped and only released by pressing $w$ back. The index, Fig. 11, is useful as a check to the counting of the turns of the handle, and is necessary in one of the methods of division. It is a figured arc, $a'$, which is advanced through one division at every turn of the handle. The spring $s''$ tends to throw it back to zero, and it comes back by releasing it from the click $k'$. In order to have ten teeth clear under the plate P for the drivers to act upon, and ten teeth in front convenient to set upon and handle the wheels, there must be another set of ten teeth under the machine, out of reach and sight, and hence the most convenient number of teeth is thirty, of which twenty are not under the plate, and are consequently not acted upon by the drivers during addition, and in this unused part is placed the carrying apparatus.

The carrying mechanism takes three forms according to the capacity of the machine. The first form is used when the number of wheels does not exceed ten; the second form when their number is between ten and twenty; and the third form when they are more than twenty in number.

Figure 13:
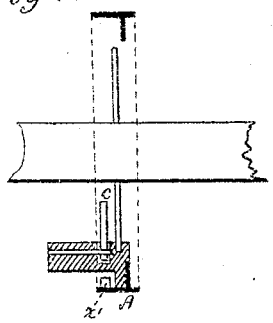
Figure 14:
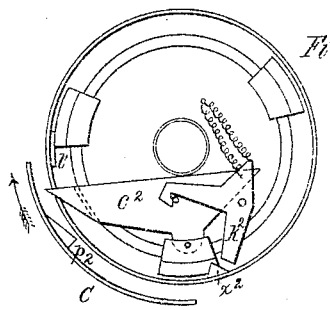
Figure 15:
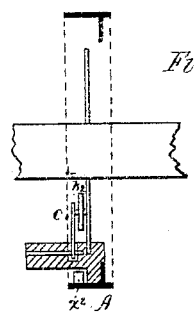
Figure 16:
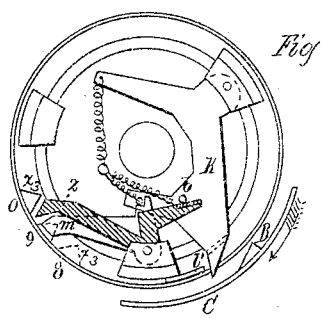
Figure 17:
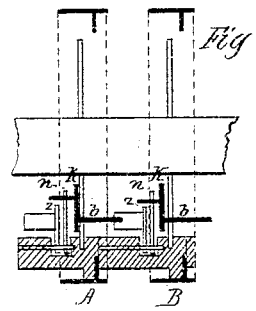

The first form is the simplest, and consists of one moving piece to each wheel. For the second wheel the carry is placed one tooth in advance of $l$; for the third three in advance, and so on, each carry is two teeth in advance of the preceding one, and consequently only ten of them can be allowed in the twenty spare teeth. If there were fifty teeth to each wheel there would be forty to spare for carrying, allowing twenty carries to be used. The carry $c$, Figs. 12 and 13, is a lever pivoted on the frame, so that it stays wherever placed. When out of action one arm is in the path of of a stud, $x_1$, on the next wheel below, and when that wheel passes from 9 to 0 it will be forced down and the other arm up, so as to be in the path of the driver $d$, which will be thrown onto the wheel the next time it comes around, and will be thrown off again by $l$, after having added one to its wheel. The lever must be thrown back by any appropriate mechanism before the drivers finish their revolution, and the particular method preferred is to fix a pin, $p_1$, on the carriage, which shall strike the lever and throw it back. When twenty wheels are used this mechanism requires fifty teeth to each wheel, and they must either be small, or the wheels large and heavy, which in either case would be objectionable.

The second form is very similar to the first; but each carry can be placed one tooth instead of two in advance of the preceding one, so that twenty wheels of thirty teeth each may be used. It consists of a lever, $c_2$, and acts in the same way as the first, but it is held out of action by a catch, $k_2$, which is released by the carrying-stud $x_2$, as the next wheel below passes onto zero. This, as well as the first apparatus, is called a consecutive carry, because it carries first from the units to the tens, then from the tens to the hundreds, and so on in a consecutive manner.

The third form is independent of the number of wheels, but on account of its complexity and consequent cost it is to be used only when there are more than twenty of them. It is not consecutive but simultaneous in its action, all the carrying being done at once and at one operation. It will work as well with a hundred wheels as with ten. It consists of three parts to each wheel—an arm, K, and two catches, $n$ and $z$, each having a spring.

The arm, when in action, acts precisely as the two simpler forms above described to throw the driver onto the wheel, and it may be thrown out of action by the same means. When out of action it will be held by the catch $n$, called the "nine catch," and when released from that it will spring but slightly, being still held by the second catch $z$, called the "zero catch." As the wheel A passes from 8 to 9 the carrying-stud $x_3$ will draw out the nine catch, and as that catch is broad on its face it will be held out as long as the wheel remains on nine, and so long as it does remain on nine the arm which acts on the driver, belonging to B, will be held only by its zero-catch, and as it passes from 9 to 0 that remaining catch will be drawn by the stud, and the arm will fall completely, causing a carriage of one to B when the drivers come along. The arm K is provided with a projection, $b$, which is the distinguishing feature of this mechanism, and which is called the "connector," because it projects through the framing and connects each carrying apparatus with the next higher one.

By the first two methods the mechanisms are entirely independent of each other, and to do away with the spiral or consecutive arrangement I found it necessary to connect them in some manner.

This connector projects through the framing, and as it falls with its arm it will strike and draw out the zero-catch belonging to the next higher wheel C and will hold it out till put back again.

The object of the connector and the two catches is the same as that of the spiral arrangement above described, to cause a carriage to take place when A passes from 9 to 0, not only to B but to C also if B reads nine when the operation commences, and to D if C reads nine, and so on to add one to every consecutive wheel that reads nine, and to the first one that does not. The arm of B falls and draws aside the zero-catch to C, and if B reads nine the falling of its arm indicates that one is to be carried to it, which will bring it to zero, and one must be carried to C also. Because B reads nine C's nine-catch will have been drawn, and consequently its arm will fall, when released, from the remaining catch by B's arm and connector; and similarly if there are any number of wheels in succession each on nine, all the nine-catches will have been drawn, and all the arms will fall at once, or substantially at once if the springs are strong, when the arm falls that belongs to the lowest wheel of the series.

The connector is the main part of this apparatus, and the other parts can be changed. In fact one complex catch may be substituted for the two simple catches, but the above arrangement I consider the best.

The carrying might all take place at once; but in that case the resistances of all the wheels act at once, and it is better to group the arms in two or more sets to equalize the action, and also to cause the pins $p_3$ to act in sets in throwing the arms out of action for the same purpose.

The third apparatus may be used only on the last wheels, and one of the others on the first ten or twenty, which are the most used. The first form is better within its range than the second or third, as it works smoother, easier, and with less noise than they.

*Addition.*—Set up the numbers one after another, and as each is set up give a turn to the handle, and the result will appear on the wheels.

*Subtraction.*—Set up the subtrahend on the wheels, either directly or by transferring from the plate; then set up the minuend according to the small figures on the plate, and subtract by a turn of the handle.

*Multiplication.*—Set up the multiplicand on the plate, and, having brought all the wheels to zero by the erasing-bar, and with the plate in its lowest position, turn the handle as many times as there are units in the right-hand figure of the multiplier, set up the plate one nick, and repeat the operation for the next figure of the multiplier; the result is shown on the wheels.

*Division.*—Set up the divisor on the plate and the dividend on the wheels, and, with the plate placed so that the divisor is over the highest figures of the dividend, turn the handle till it stops and will go no further, the number of turns given, less one, being the first quotient-figure. Set the plate up half a space and turn once, which will add the divisor once and correct the error of subtracting it once too often. Set the plate down a space and a half, and repeat the operation for the remaining figures as far as may be desired. This is the automatic method; but there is another which is less independent of the attention of the operator. Set up as before, and as the handle is turned watch the dividend till it becomes less than the divisor, and the number of turns given is the quotient-figure. Set down one space and repeat. The index is necessary here, as the attention of the operator is required to watch the dividend.

I claim as my invention, and desire to secure by Letters Patent—

1. The combination of two pins, $p$ and $p'$, in the plate P, with the driver $d$, so that it shall be thrown onto the wheel A by the pin $p'$ and off again by the pin $p$, substantially as set forth.

2. Providing the driver $d$ with a pointed head, so that it will be thrown onto or off the wheel A, according as the right or left side of the point strikes the pin $p$, substantially as described.

3. The combination of bar E with pins $p_1$ on the wheels A, B, C, &c., substantially as and for the purpose specified.

4. The arm K, which is thrown into the path of the driver $d$ by the carrying-stud $x$, substantially as described.

5. The connector $b$, so arranged as to throw the carrying apparatus belonging to any decimal place into action when the carrying apparatus belonging to the next decimal place below is in action and the value of that place is at the same time nine, substantially as hereinbefore set forth.

6. The combination of the catches $n$ and $z$, or their equivalents, in the carrying apparatus, the catch $n$ to hold it out of action till the next decimal place below reads nine, and the catch $z$ till that place reads zero, if its carrying apparatus is not in action, substantially as set forth.

This specification signed December 26, 1872.

GEO. B. GRANT.

Witnesses:
JOHN B. SAWIN,
SUSAN N. SAWIN.